United States Patent

Harmeyer

[11] Patent Number: 4,491,694
[45] Date of Patent: Jan. 1, 1985

[54] TELEPHONE TO STEREO AMPLIFIER INTERFACE COUPLING

[76] Inventor: Michael Harmeyer, 3001 Haring Rd., Metairie, La. 70002

[21] Appl. No.: 314,425

[22] Filed: Oct. 23, 1981

[51] Int. Cl.³ .............................................. H04M 1/60
[52] U.S. Cl. ............................... 179/100 L; 179/81 B; 179/2 C
[58] Field of Search .............. 179/2 C, 100 L, 81 B; 455/344; 381/28

[56] References Cited

U.S. PATENT DOCUMENTS

| | | | |
|---|---|---|---|
| 2,048,482 | 7/1936 | Babcock | 179/1 C |
| 3,602,800 | 8/1971 | Feldman et al. | 179/1 C X |
| 3,822,364 | 7/1974 | Lee | 179/2 C |
| 3,975,588 | 8/1976 | Besseyre et al. | 179/1 HF X |
| 4,338,492 | 7/1982 | Snopko | 455/344 X |
| 4,367,374 | 1/1983 | Serrano | 179/2 C |

FOREIGN PATENT DOCUMENTS

| | | | |
|---|---|---|---|
| 2536325 | 2/1977 | Fed. Rep. of Germany | 179/1 HF |
| 2714608 | 10/1978 | Fed. Rep. of Germany | 179/81 B |
| 56-71344 | 6/1981 | Japan | 455/344 |

*Primary Examiner*—Keith E. George

[57] ABSTRACT

A telephone-stereo "speakerphone" telephone amplifier apparatus is disclosed, the apparatus comprises a standard telephone, a home entertainment variety stereo amplifier, two loudspeakers and microphone mixer (including signal sources) connected by an interface coupler which serves as a junction location for routing of interconnecting wires and a housing for a mode switch and protective circuitry, transforming the component parts into a full duplex (simultaneous two way) transmit preamplifier and receive monitor audio communication system. To enhance convenience the interface coupler provides a mode switch for selection of one of two desired modes of operation. In one position (telephone interface mode) the switch automatically makes all necessary connections for operation of the components in combination as a telephone-stereo "speakerphone" telephone amplifier. In the other position (stereo mode) the switch breaks contact between the telephone and stereo and returns both to independent normal operation.

2 Claims, 2 Drawing Figures

TELEPHONE TO STEREO AMPLIFIER INTERFACE COUPLING

BACKGROUND OF THE INVENTION

The original inspiration for this circuit was a vague concept of an amateur radio phone patch. These devices are normally of the "push to talk" or "voice operated exchange" (VOX) type due to the one way at a time nature of two way radio communication. Also known was of the existance of telephone "hook ups" used in commercial radio and television broadcast stations. Although the principal of both of these types of couplers was known my device was not patterned intentionally off either.

In the prior art are numerous examples of telephone amplifying systems. Most commercially available "speakerphones" are of the VOX simplex (single channel at a time) type which thwart the natural simultaneous two way characteristic of the telephone medium. The reason for this is that most speaderphones have the microphone and speaker built into the same cabinet housing which would cause a feedback problem if operated as a duplex (simultaneous two way) system. Many patents in the prior art provide improvements to the basic telephone amplifier scheme primarily in the realm of feedback suppression by means of automatic volume control (signal comparison) circuitry. My design rejects the necessity of feedback suppression circuitry relying on the user's discretion with regard to microphone and speaker proximity to sucessfully avoid feedback.

The prior art shows that it has long been understood that two amplifiers could be used to amplify the incoming and outgoing signals of a telephone. It is not my intention, therefore, to proclaim as novel the well known fact that a stereo amplifier is two amplifiers, rather that a stereo being two amplifiers is particularly suited to amplify the telephone composite signal. To clarify by reference to the prior art, Snopko (U.S. Pat. No. 4,338,492) reveals not that a television contains an audio amplifier but rather that it can be used to amplify a telephone and contributes a unique circuit design to interface the telephone and the television.

If a home entertainment variety stereo amplifier used as a speakerphone can be distinguished from speakerphones designed primarily for that purpose then the invention is the combination of the telephone, stereo, speakers, mixer, signal sources (microphone etc.) and the interconnecting apparatus rather than just the interconnecting apparatus. The claims are therefore framed to express that viewpoint.

The idea came as a result of my telephone and my stereo being physically next to each other. I thought, "I wonder what would happen if I connect these wires to this?" Consequently I discovered the astonishingly natural suitability of a stereo amplifier for use as a speakerphone and its potential in the realm of music. With this device it is possible to play music by telephone. One can put a band together by conference call for jam sessions, rehearsal, recording, auditions, and live broadcast over radio and television.

SUMMARY OF THE INVENTION

Due to the large speakers and high power of modern stereo amplifiers the disclosed device will surpass the performance of most commercially available speakerphones. The primary objective, however, is to creatively exploit a dormant resource by using a home variety stereo as a telephone amplifier thereby eliminating the need of further expense for essentially duplicate equipment.

A BRIEF DESCRIPTION OF THE DRAWINGS

Figure 1:
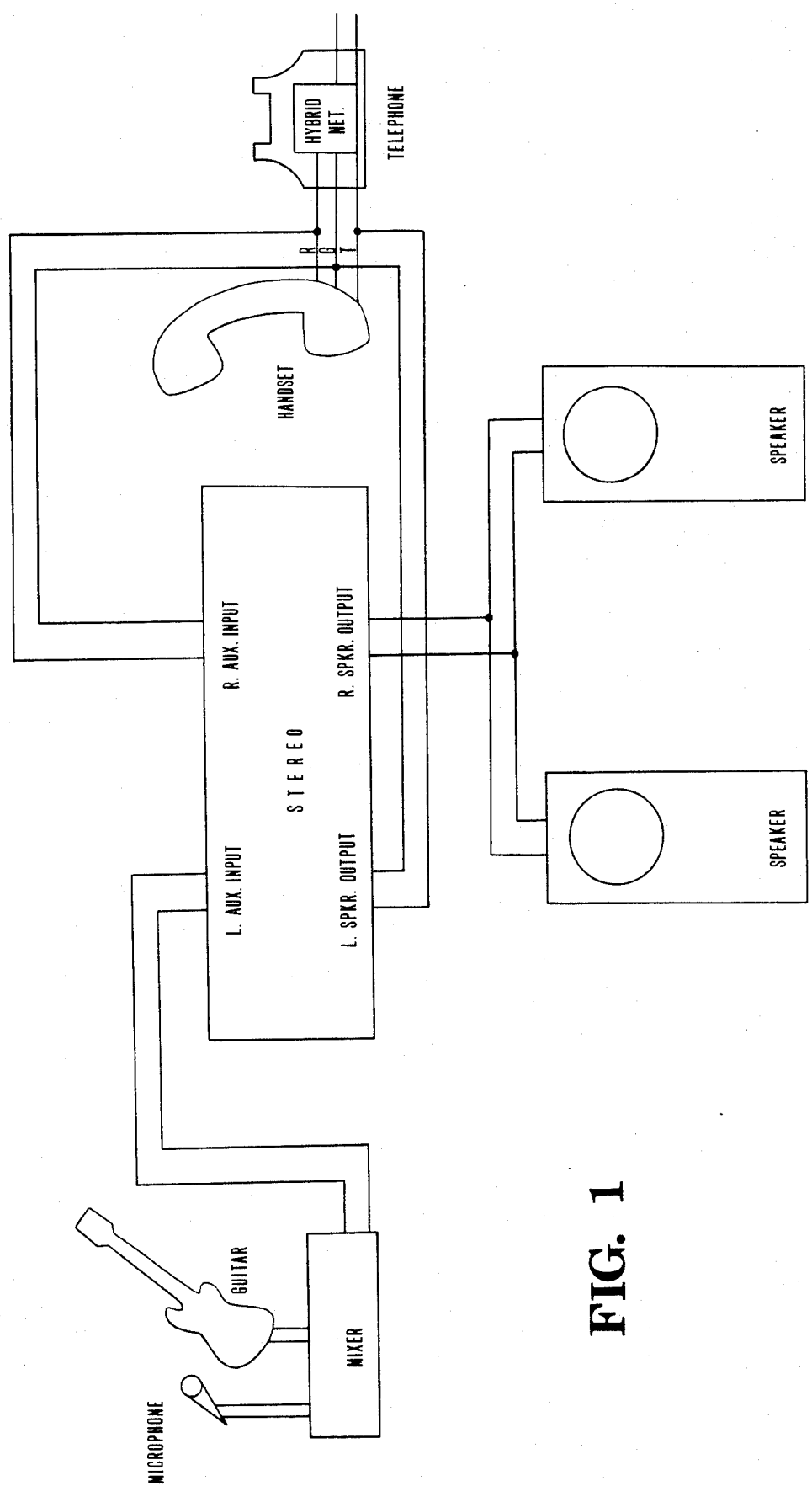
FIG. 1 is a block diagram of the telephone-stereo "speakerphone" telephone amplifier system.
Figure 2:
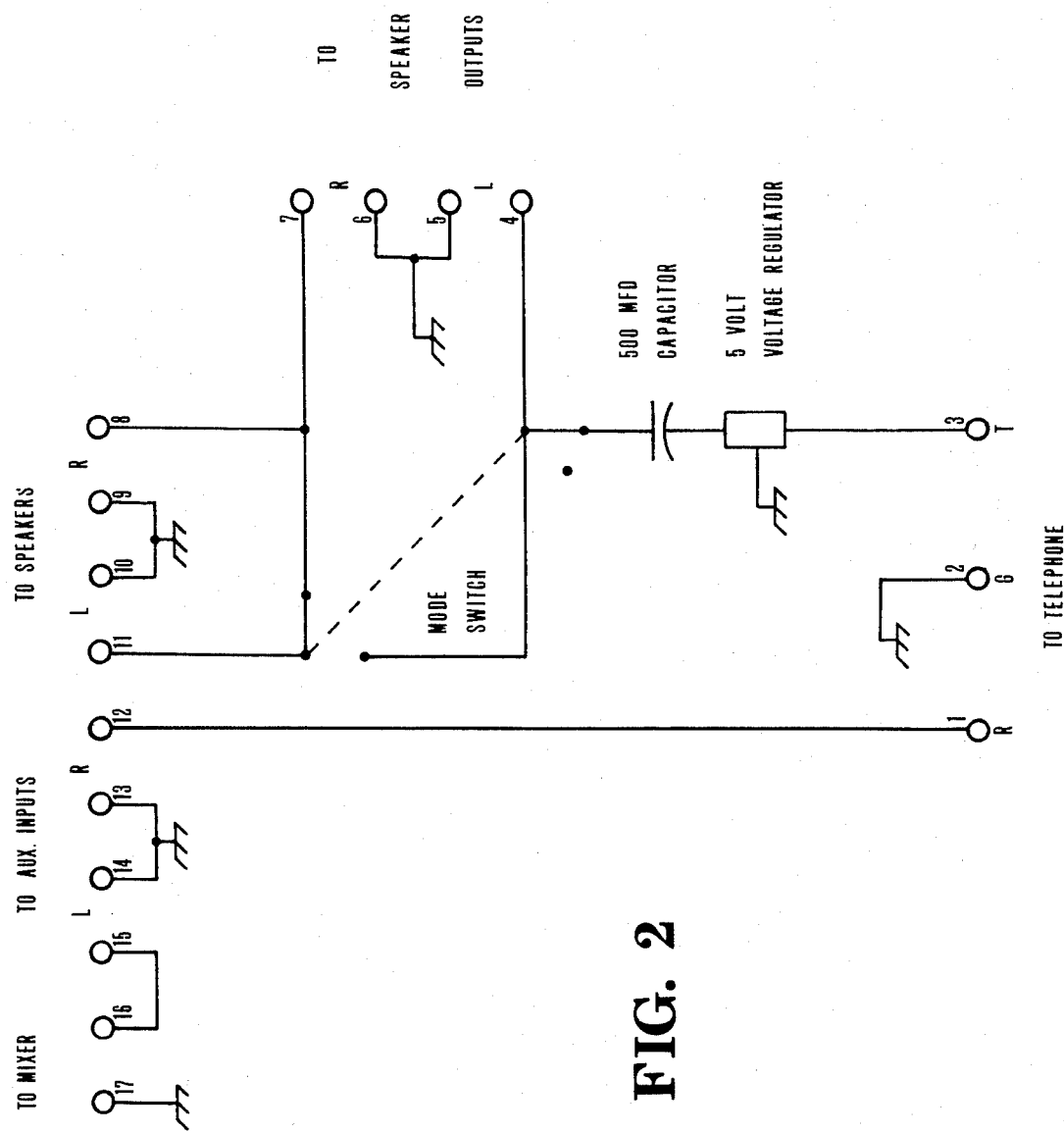
FIG. 2 is a schematic diagram of the interface coupler circuit.

For the purpose of illustrating the basic principal of the telephone-stereo "speakerphone" telephone amplifier the description is done in two parts corresponding to the drawings FIG. 1 and FIG. 2. The first part offers a bird's eye view of the overall interaction of the various component parts comprising the system. The second part describes an interface coupler apparatus that employs the underlying basic principal as described in the first part that also serves as a junction location for routing of interconnecting wires and housing for added mode switch and protective circuitry.

With the mode switch in the telephone interface position (as seen in FIG. 2) FIG. 2 is by topological transformation equivalent to FIG. 1.

DESCRIPTION OF A PREFFERED EMBODIMENT

The physical connection to the telephone can be made by unscrewing the earphone and microphone of the telephone handset then using alligator clips on the contacts, or by following the handset wires inside the body of the telephone to the internal terminals and connecting directly to these connections, or on some telephones, by use of a modular plug at the base of the telephone body where the handset plugs in leaving the handset unplugged. If the handset is left wired in the circuit it goes dead when the stereo power is on and operates normally when the power is off.

A stereo amplifier has two seperate amplifying (left and right) main channels both of which are capable of driving loudspeakers. Most modern stereos are equipped with auxiliary input jacks and speaker output recepticals. Because of the wide variety of terminals to be found on stereo equipment the use of adapters or direct wiring may be necessary with some stereo amplifiers. Most stereos usually have on the back panel input jacks (most often phone type) marked phono, tape or auxiliary. These inputs access preamplifiers in the stereo amplifier circuitry that have different impedance characteristics. Normally the input marked auxiliary will be most compatable with the process and components herein described.

As seen in FIG. 1 a standard telephone contains a hybrid network which splits the signal on a pair of wires that comes from the wall onto three wires labeled R,G and T (Receive, Ground and Transmit) which go to the handset. The interface with the stereo is made at these three wires.

The output wires from the telephone R and G connect to the right auxiliary input of the stereo. The stereo right speaker output connects to the two speakers in parallel circuit. The microphone mixer with microphone and other signal sources plugged into it connects to the stereo left auxiliary input and the stereo left speaker output connects to the telephone input wires T and G.

One channel of the stereo (arbitrarily the right) is used to amplify the incoming or receive signal from the telephone. The other channel (left) is used to amplify the outgoing or transmit signal to the telephone. The incoming signal from the telephone after being amplified by the right channel of the stereo is heard on the two loudspeakers in mono. The transmit portion begins as a microphone or other signal source fed through a microphone mixer then amplified by the left channel of the stereo the output of which is connected to the input of the telephone. The transmit signal can also be heard on one's own speakers because it mixes in the telephone and comes back through the receive channel.

Referring to FIG. 2, a double-pole double-throw switch is used to connect the speakers together in parallel circuit to the stereo right speaker output during telephone interface mode and returns them to normal operation simultaneously disconnecting the telephone from the stereo left speaker output during stereo mode. Protective circuitry is included to conform to F.C.C. regulations. Use of a 500 MFD capacitor in the transmit line between the stereo left speaker output and the microphone input of the telephone isolates D.C. current. By F.C.C. tarrif 68.301 an input signal to the telephone must not exceed five volts maximum. A five volt voltage regulator is used in the transmit line as a precautionary measure. A voltage regulator will not affect the quality of a normal signal.

Terminal 1 is connected from the telephone output wire R and connects to terminal 12 which combined with terminal 13 form a receptical for connection to the stereo right channel input. The stereo right speaker output connects to terminals 6 and 7 (6 being ground). When the mode switch is in the telephone interface position as shown, terminal 7 connects to both speaker terminal pairs 8, 9 and 10, 11 (9 and 10 being ground). Terminals 16 and 17 form a receptical which connects to the stereo left auxiliary input. Terminals 10 and 11 (10 being ground) form a receptical which connects to the stereo left speaker output. Terminal 4 connects through the mode switch to the 500 MFD capacitor which then connects to the voltage regulator (one pin of the voltage regulator is connected to ground) which then connects to terminal 3. The combination of terminals 1, 2 and 3 (2 being ground) form a receptical which connects to the telephone handset wires R,G and T.

What is claimed is:

1. A telephone-stereo amplifier speakerphone apparatus which functions as a full duplex speaker phone, said apparatus comprising:
   A. a standard telephone having a transmit line and a receive line;
   B. a home entertainment variety stereo (two channel) amplifier system and two speakers;
   C. a mixer;
   D. signal source means such as a microphone or electric guitar connected to one or more inputs of the mixer;
   E. an interface coupler connected to an output of the mixer, to both inputs and both outputs of the stereo amplifier system and to both speakers, wherein:
      1. the coupler connects one channel of the stereo amplifier system as a transmit channel to amplify signals from the mixer and output amplified signals to the transmit line of the telephone; and
      2. the coupler connects the second channel of the stereo amplifier system as a receive channel to amplify signals from the recieve line of the telephone and output amplified signals to the speakers.

2. A speakerphone apparatus as in claim 1 wherein the interface coupler comprises:
   A. double-pole double-throw mode switch means which in a telephone interface position, electrically connects the output of said transmit channel to the transmit telephone line and connects said speakers together in parallel to the output of the receive channel, said switch means connecting said speakers to speaker outputs of the stereo amplifier system when it is in a stereo position;
   B. capacitor means isolating direct current between said transmit channel output and said telephone transmit line;
   C. voltage regulator means limiting transmit signal voltage from said transmit channel output to said telephone transmit line;
   D. mechanical connector means consisting of plugs, jacks and wires for
      (1) connecting said interface coupler to said telephone;
      (2) connecting said interface coupler to said stereo amplifier system
      (3) connecting said interface coupler to said speakers; and
      (4) connecting said interface coupler to said microphone mixer.

* * * * *